United States Patent Office 2,972,889
Patented Feb. 28, 1961

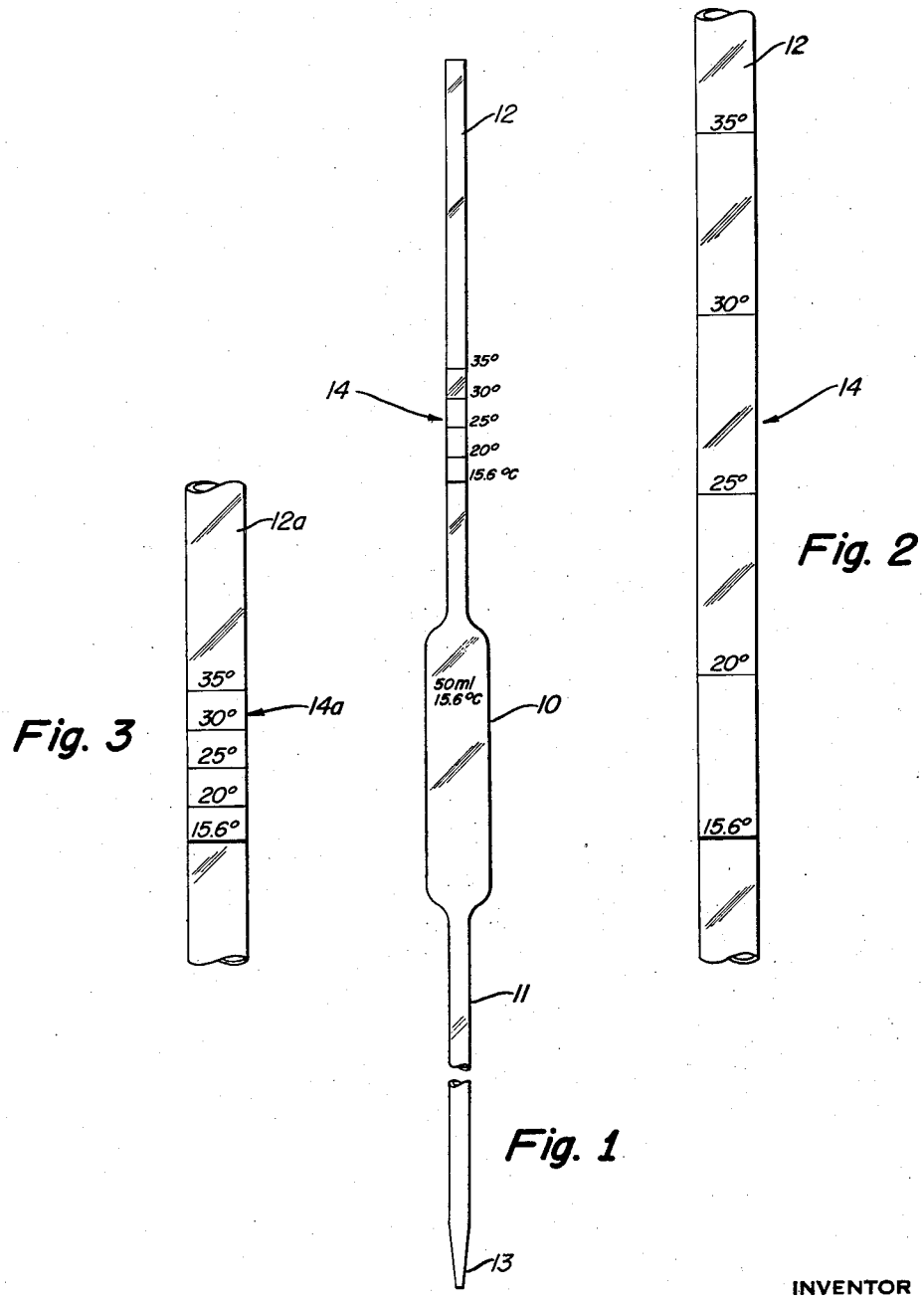

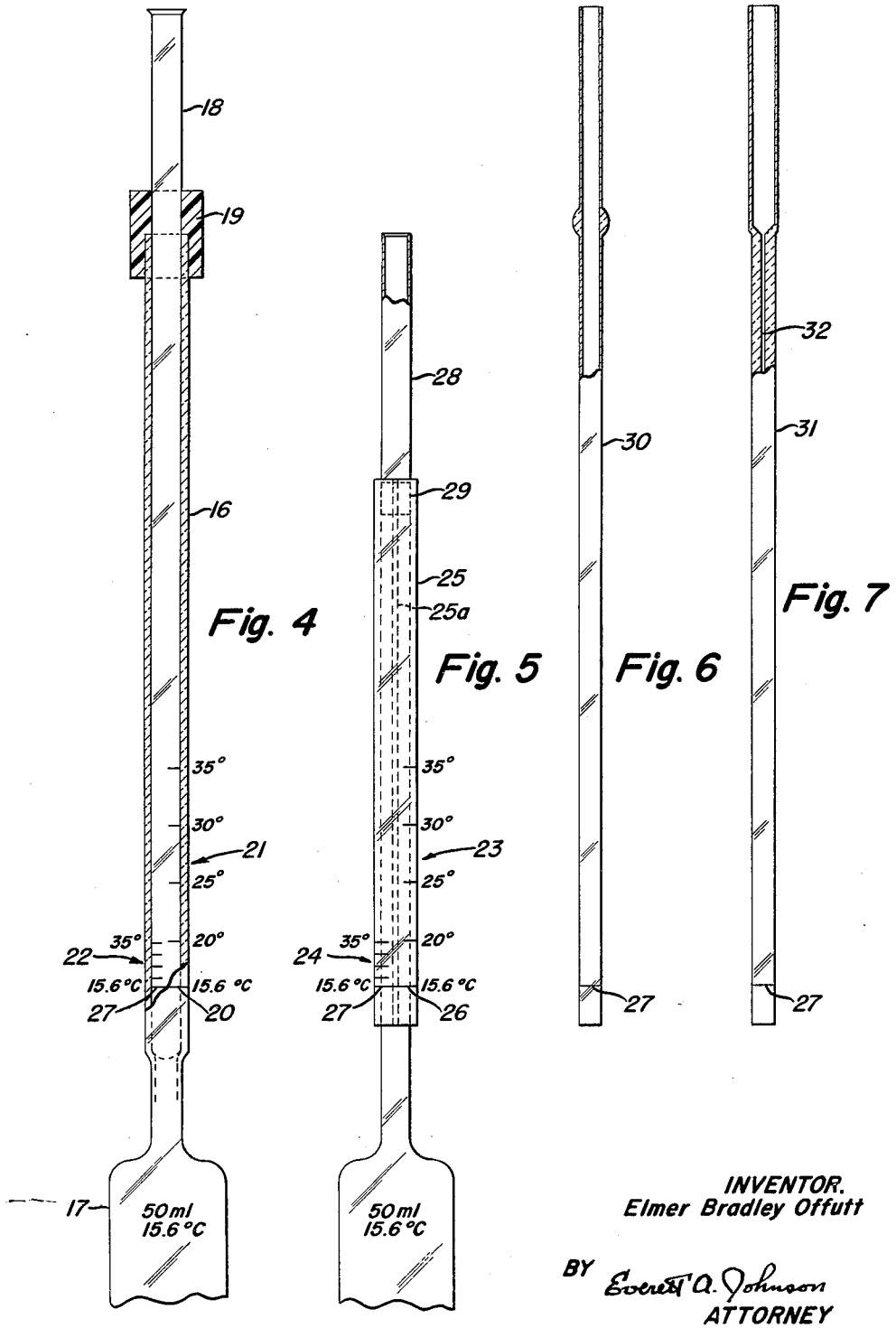

2,972,889

UNIVERSAL TEMPERATURE CALIBRATED PIPETTE

Elmer Bradley Offutt, Independence, Mo., assignor to Standard Oil Company, Chicago, Ill., a corporation of Indiana Filed July 18, 1956, Ser. No. 598,599

1 Claim. (Cl. 73—425.4)

This invention relates to pipettes and, more particularly, to a calibrated pipette.

It is frequently desired to deliver a given weight or standard volume of a liquid without the necessity of bringing such liquid to a standard temperature prior to the pipetting operation and without the necessity for making calculations to adjust the weight or volume to a standard temperature. Heretofore it has been necessary to perform one or the other of these operations when it is desired to deliver such a standard quantity of liquid.

An example where such is to be desired is in connection with the determination of tetraethyllead in gasoline as described and claimed in a copending application S. N. 165,164, filed May 31, 1950, jointly with Leonard V. Sorg, now Patent No. 2,773,237, for "Direct Reading System for Metal Ion Determination," this application being a continuation-in-part of said copending application and of my copending application S. N. 389,192, filed October 30, 1953, and entitled "Temperature Calibrated Pipette," now abandoned.

Also, in ASTM Method D-526, for the determination of tetraethyllead in gasoline, there are requirements that the sample temperature measurement be made in order to correct results to a sample volume of 60° F. (15.6° C.). This can conveniently be done by means of my pipette graduated to permit measuring a sample equivalent in volume to a specified volume at 60° F. (15.6° C.).

Pipettes employed in chemical and biological work include elongated tubes of predetermined capacity and are used for drawing off a measured quantity of liquid at ambient temperature from a vessel containing a larger quantity. Heretofore it has been necessary to correct the apparent volume by calculation or by adjusting the actual temperature of the sample. This introduces errors and is generally not satisfactory.

An important object of my invention is, therefore, to provide a pipette construction which will avoid the necessity for correcting a quantity of liquid by calculation or adjustment of its temperature. A further object of the invention is to provide a calibrated pipette which will deliver a known quantity of liquid at a known temperature. Still another object of the invention is to provide a pipette which is temperature calibrated and which is universal in its application to aqueous and hydrocarbon liquids. These and other objects of my invention will become apparent as the description thereof proceeds.

The pipette, according to my invention, is not intended to eliminate the use of thermometers, but rather to avoid the use of temperature correction factors. Accordingly, an important object is to provide means to measure directly the corrected volume of liquid at the prevailing temperature which may be measured conveniently by the use of an appropriate thermometer.

Briefly, my invention comprises a pipette having a flow tube, a calibrated stem and an intermediate enlarged portion or chamber. The stem is calibrated to read a given single volume of liquid at known temperatures over a desired range. Merely knowing the temperature of the liquid permits accurate delivery of the standard quantity of liquid by filling the pipette to a level corresponding to the volume at that temperature for the rated weight of liquid. Accordingly, the scale on the stem is calibrated merely in degrees of temperature (Centigrade or Fahrenheit) and each degree mark represents the adjusted or corrected volume of the standard quantity of liquid at the indicated temperature.

Further details and advantages of my invention will be described in conjunction with the accompaning drawings wherein:

Figure 1 is an elevation of a pipette employing my novel scale;

Figures 2 and 3 represents scales graduated for oil and water respectively;

Figure 4 is an enlarged view, partly in section, including a graduated scale tube within a pipette stem;

Figure 5 is a fragmentary elevation including an external removable graduated scale;

Figure 6 represents another embodiment of a scale tube which may be employed in the pipette stems of Figures 4 and 5; and Figure 7 is an adaptor tube for use with the removable scale and the pipette stem of Figure 5 whereby differences in the coefficients of expansion are compensated for to enable the use of a single pipette on either water or oil.

The volume of liquid delivered by the pipette at the particular temperature will be a volume adjusted in accordance with the prevailing temperature so as to contain the same amount of liquid material as would be contained in a specified fixed volume at a specified fixed temperature. For example, by the use of the special pipette described herein, a volume of gasoline having a temperature in the range of between 15.6° C. and 35° C. can be measured, which volume will be exactly equivalent to a 50 ml. volume of the gasoline at 15.6° C. (60° F.). Such a scale is illustrated in Figure 2.

Referring to the drawings, the lower end, or the end adapted to be placed in the vessel containing the liquid, is drawn or beveled down to a reduced diameter so that the bore 13 therethrough is substantially less than the internal diameter of the discharge line or tube 11 itself. An enlargement in the tube itself provides a bulb or reservoir chamber 10. The upper end of the pipette comprises a tubular stem 12 of restricted diameter and open at its upper end. The liquid is drawn into the pipette by placing the lower end of tube 11 in the vessel containing the liquid and applying suction to the open end of the stem 12 of the pipette. The upper end of stem 12 is then closed by placing the finger thereon and the relatively small diameter of the passage through the lower end 13 of the delivery tube 11 prevents any of the liquid from running out of the pipette.

Great care has been exercised in the manufacture of pipettes in order to produce a relatively uniform inside diameter, and because of the difficulties involved in making an accurate pipette the expense thereof is relatively high. However, according to my invention the upper translucent stem 12 of the pipette is provided with a scale 14 which indicates directly the level of liquid in the stem necessary to deliver a standard quantity of the liquid at the ambient temperature.

The pipettes are ordinarily made to capacities of 10, 25, 50 and 100 ml. Suitable scales 14 for the adjusted volumes for the rated capacity can be devised for hydrocarbons and water knowing the data on the volume of the pipette and inner diameter of the stem then referring to Tables I, II, III and IV.

Table I

[50 ml. capacity, stem 5.7 mm. I.D.]

| Temp., °C. | Temp. Interval | ml./°C. | ml./Interval | ml./Inch | Inches Interval | Inches Above 15.6° C. Mark |
|---|---|---|---|---|---|---|
| 15.6 | 4.4 | 0.062 | 0.272 | 0.65 | 0.000 | 0.00 |
| 20 | 5 | 0.062 | 0.310 | 0.65 | 0.420 | 0.42 |
| 25 | 5 | 0.062 | 0.310 | 0.65 | 0.476 | 0.90 |
| 30 | 5 | 0.062 | 0.310 | 0.65 | 0.476 | 1.37 |
| 35 | 5 | 0.062 | 0.310 | 0.65 | 0.476 | 1.85 |

A similar scale 14a for water in the pipette can be derived as follows:

Table II

| Temp., °C. | Relative Volume[1] | Absolute Volume, cc. | ml./°C. | ml./Interval | ml./Inch | Inches Interval | Inches Above 15.6° C. Mark |
|---|---|---|---|---|---|---|---|
| 15.6 | 1.00097 | 50.00 | 0.013 | 0.057 | 0.65 | 0 | 0 |
| 20 | 1.00177 | | 0.013 | 0.065 | 0.65 | 0.088 | 0.09 |
| 25 | 1.00294 | | 0.013 | 0.065 | 0.65 | 0.100 | 0.19 |
| 30 | 1.00435 | | 0.013 | 0.065 | 0.65 | 0.100 | 0.29 |
| 35 | 1.00598 | 50.25 | 0.013 | 0.065 | 0.65 | 0.100 | 0.39 |

[1] Page 1652 "Handbook of Chemistry & Physics," 29th edition.

Table III

| | | Rated Pipette Capacity at 15.6° C. | | |
|---|---|---|---|---|
| | | 50 ml. | 100 ml. | 25 ml. |
| Stem, mm. I.D.: | | In./5° C. | In./5° C. | In./5° C. |
| 5.7 | Water | 0.10 | | 0.05 |
| 5.5 | do | 0.108 | 0.216 | 0.054 |
| 5.0 | do | 0.130 | 0.260 | 0.065 |
| 4.5 | do | 0.161 | 0.322 | 0.080 |

Table IV

| | | Rated Pipette Capacity at 15.6° C. | | |
|---|---|---|---|---|
| | | 50 ml. | 100 ml. | 25 ml. |
| Stem, mm. I.D.: | | In./5° C. | In./5° C. | In./5° C. |
| 5.7 | Gasoline | 0.476 | 0.952 | 0.238 |
| 5.5 | do | 0.515 | 1.030 | 0.257 |
| 5.0 | do | 0.619 | 1.238 | 0.309 |
| 4.5 | do | 0.767 | 1.534 | 0.383 |

Referring to Figure 4, the stem 16 on the pipette having a bulb or reservoir chamber 17 is enlarged to accommodate the insertion of scale tube 18 to provide a continuation of the stem 16 having substantially the same internal diameter. A resilient sleeve 19 secures the scale tube 18 in the desired position within the stem 16. It will be understood that the bench mark 20 for 15.6° C. on the two scales 21 and 22 are aligned with the bench mark 20 on the stem 16.

In Figure 5 the scales 23 and 24 are carried by a removable split sleeve 25 which is transparent and which has a base mark 26 which is aligned with the corresponding bottom mark 27 representing 15.6° C. on the stem 28. A strip of pressure sensitive adhesive 29 may be provided to prevent an unintentional relocation of the sleeve 25 along the length of the stem 28. Ordinarily the sleeve will be constructed of thin clear plastic material which frictionally engages the exterior of the stem 28. It is also contemplated, however, that a number of perforations of substantial area may be provided in the sleeve 25 removed from the scales 23 and 24 so that pressure sensitive adhesive tape may be wrapped about the sleeve 25 and contact the stem 28 through the perforations.

It is also desired to provide a pipette wherein a single pipette having a single scale may be employed for sampling of both hydrocarbon and aqueous liquids. This is made possible by the conversion tubes 30 and 31 illustrated in Figures 6 and 7. The internal diameter of the bore 32 in tube 31 of Figure 7 is chosen so as to compensate for a relatively low thermal expansion of water as compared to the hydrocarbon. Thus by providing a scale 33 corresponding to Figure 2 on a pipette stem 16 of Figure 4 or on the sleeve 25 of Figure 5 one may convert a pipette for use in handling either oil or water.

Thus a pipette having the selected scale may be used for selecting a 50 ml. sample of gasoline at the ambient temperature, an extract of the gasoline is prepared according to ASTM Method D-526; and 50 ml. of the extract can in turn be delivered into a polarograph titration apparatus employing the same pipette with an expansion-compensated tube 31 such as shown in Figure 7 inserted into the pipette stem. By this means a single scale designed for oil can be used on the aqueous extract as well, the decreased internal diameter of the compensating tube 31 serving to magnify the volume changes corresponding to the ambient temperature.

Although I have described the invention in terms of examples set forth in some detail, it should be understood that these are by way of illustration only and that the invention is not limited thereto. Alternative embodiments will become apparent to those skilled in the art in view of my description of the invention, and accordingly it it contemplated that modifications may be made in the invention without departing from the spirit thereof.

What I claim is:

In pipette for use in determining the tetraethyllead content in gasoline, and of the type having a liquid reservoir chamber, a discharge line depending from said chamber, a vertically extending stem axially aligned with and carried by said chamber and having a bore through said stem, said liquid reservoir chamber, said discharge line, and said vertically extending stem being in fluid communication, and an index mark on said vertically extending stem indicating the delivered volume of a liquid at a standard temperature, the improvement whereby the pipette is capable of delivering, at a plurality of temperatures, either water or gasoline, said gasoline having a different coefficient of expansion from water, which comprises a single replaceable sleeve insertable around said vertically extending stem and alignable with said index mark, and two graduated scales on said sleeve calibrated in degrees of temperature, the first scale indicating the delivered volumes of water over a range of temperatures equivalent to the delivered volume of water at the standard temperature, and the second scale indicating the delivered volumes of gasoline over a range of temperatures equivalent to the delivered volume of gasoline at the standard temperature.

References Cited in the file of this patent

UNITED STATES PATENTS

| | | |
|---|---|---|
| 1,252,347 | Homstead | Jan. 1, 1918 |
| 1,290,553 | Hassinger | Jan. 7, 1919 |
| 1,355,970 | Hassinger | Oct. 19, 1920 |
| 1,386,571 | Jackson | Aug. 2, 1921 |
| 1,533,753 | Munch | Apr. 14, 1925 |

(Other references on following page)

FOREIGN PATENTS 322,864  Germany _____ July 10, 1920

OTHER REFERENCES

Providing for Changes in Temperature in Volumetric Analysis, by Mellon, Analytical Chemistry (formerly published under the title of "Industrial and Engineering Chemistry, Analytical Edition"), July 15, 1930, vol. 2, No. 3 (pp. 260 to 263).

"Laboratory Apparatus, Catalog C. No. 227," publication by Central Scientific Co., Chicago, Ill., 1927, pages 560–561.

"Laboratory Apparatus and Reagents," publication by Fisher Scientific Co., Pittsburgh, Pa., 1926, page 495.

"Ace General Catalog 40," publication by Ace Glass Inc. Vineland, N.J., 1940, page 135.

"Selected Laboratory Equipment, Catalog No. 50," publication by Shaar & Co., Chicago, Ill., pages 539 and 551.